(12) United States Patent
McAllister

(10) Patent No.: US 8,199,432 B2
(45) Date of Patent: Jun. 12, 2012

(54) EXTENDED TAPE PATH LENGTH BETWEEN NIP POINT AND GUIDE IN TAPE DRIVE

(75) Inventor: Jeffrey S. McAllister, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 925 days.

(21) Appl. No.: 12/241,995

(22) Filed: Sep. 30, 2008

(65) Prior Publication Data

US 2010/0078513 A1    Apr. 1, 2010

Related U.S. Application Data

(60) Provisional application No. 61/053,051, filed on May 14, 2008.

(51) Int. Cl.
*G11B 15/60* (2006.01)

(52) U.S. Cl. .................................................. 360/130.21
(58) Field of Classification Search ................... 360/93, 360/95, 130.21, 130.31
See application file for complete search history.

(56) References Cited

U.S. PATENT DOCUMENTS

| | | | | |
|---|---|---|---|---|
| 5,173,828 A | * | 12/1992 | Tanzer et al. | 360/130.21 |
| 6,405,957 B1 | * | 6/2002 | Alexander et al. | 242/346 |
| 2006/0187575 A1 | * | 8/2006 | Sachuk | 360/95 |
| 2007/0025012 A1 | * | 2/2007 | Sachuk | 360/93 |

* cited by examiner

*Primary Examiner* — Angel A. Castro

(57) ABSTRACT

One embodiment is a method that extends a tape path to compensate for misalignment between tape on a reel and a head by exiting the tape twice from a tape pack of the reel before reading or writing data at the head.

15 Claims, 4 Drawing Sheets

EXTENDED TAPE PATH LENGTH BETWEEN NIP POINT AND GUIDE IN TAPE DRIVE

CROSS REFERENCE TO RELATED APPLICATIONS

This Application claims the benefit of U.S. Provisional Application Ser. No. 61/053,051, filed May 14, 2008, titled "Extended Tape Path Length Between Nip Point And Guide In Tape Drive" which is hereby incorporated by reference herein as if reproduced in full below.

FIELD OF THE INVENTION

The invention relates to a tape drive and more particularly a tape drive having an extended tape path length between a nip point and a tape guide.

BACKGROUND

Tape drives store a vast amount of digital information on rolls of magnetic tape and are often used to backup information stored in computer systems. In a typical drive, magnetic tape is stored on a supply reel contained in a removable cartridge. During read and write operations, the tape is passed at a very high speed along a series of guides that define a tape path to a take up reel in the drive. The tape passes in close proximity to an assembly of read heads and write heads that must be precisely positioned over the desired tracks so data can be accurately read or written.

As magnetic tape is wound onto a tape reel at high speed, the tape entrains air which allows the tape to float over the tape pack. As the tape floats, it drifts to the sides of the reel until the tape finally settles against the top or bottom flange of the reel. The reel flanges are relatively far away from the edge of the free length of tape to prevent the tape from contacting the reel as the tape is winding. If the free length of tape contacts the reel flanges, the impact will cause the tape to abruptly move laterally and disrupt registration between the read/write head and the data track location. Because of the clearance needed to avoid contact with the reel flanges while winding onto the reel, the tape pack ends up being misaligned in height from the tape guides. As the tape is then pulled from that reel, the misalignment of the tape pack with the tape guides can create excessive stress on the edges of the tape. This misalignment also creates disturbances from the guide flanges to the tape and causes track misregistration.

DETAILED DESCRIPTION

Figure 1:
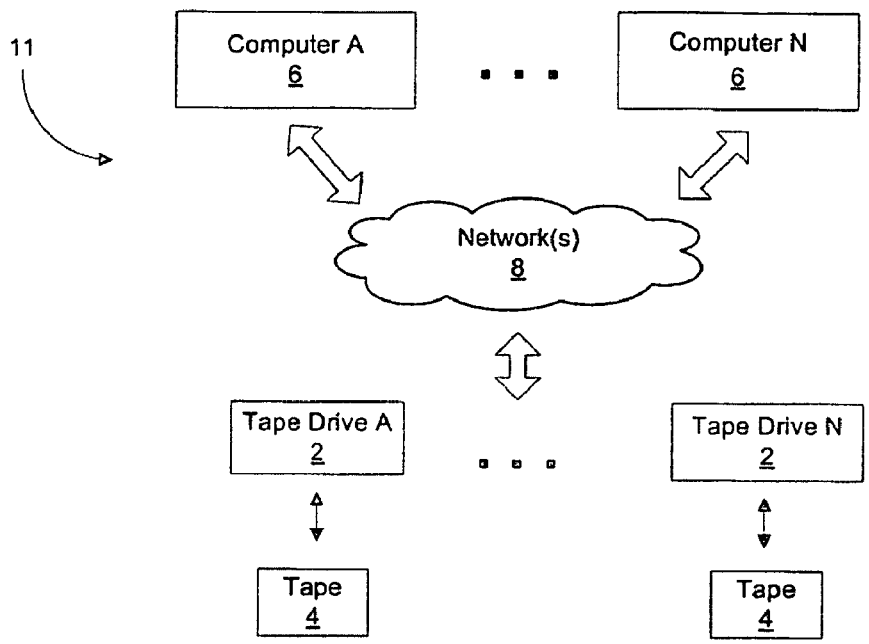
FIG. 1 is a tape drive system in accordance with an exemplary embodiment of the present invention.

Embodiments in accordance with the present invention are directed to apparatus, systems, and methods that extend a tape path length in a tape drive between a nip point and a tape guide. When magnetic tape is being pulled from a tape pack of a drive reel, the tape passes from the tape pack, to a guide, and back onto the tape pack. The tape passes partially around the tape pack and then exits a second time from the drive reel. After exiting the tape pack for the second time, the tape passes to another guide, past the head, and to a cartridge reel located in the tape drive.

One embodiment provides a tape drive with an additional guide element (such as a flangeless guide or roller) that is added to the tape path to pull the tape from the pack earlier to increase the distance between the nip point and the first guide element. This reduces the angle of misalignment of the tape as it enters the first flanged guide element. The effective length of the tape path can be extended without increasing the size of the drive.

Exemplary embodiments increase the effective free length of tape between a nip point of the tape pack of the drive reel and the guide. This is accomplished by placing a flangeless guide element (such as a guide or roller) at another location around the reel which the tape wraps around before then wrapping back on the tape pack itself and then eventually entering the flanged guide element. This additional guide peels the tape off farther upstream of the tape path and effectively increases the free length of tape between the nip point and the flanged guide element. At a high rate of travel, the tape that wraps back over the tape pack has a layer of entrained air under it which causes the tape to freely float. The entire length of tape between the new nip point and the guide element is effectively free or unconstrained. Therefore, the angle of misalignment between the new nip point and the flanged guide is reduced by the ratio of the increase in the effective free length of tape.

When the tape pack is not properly or centrally aligned or off-center between the flanges of the reel, exemplary embodiments lengthen an effect free length of tape or distance of tape travel to compensate for this improper alignment. As such, the tape unwinds from the drive reel in proper alignment with the tape guides and/or read and write heads.

Exemplary embodiments eliminate stress imparted on the tape from contact with guide flanges and flanges on the drive reel since the tape being unwound and wound onto the tape pack of the drive reel is aligned between the flanges of the drive reel. Further, problems associated with misregistration at the read/write head caused by disturbances between the tape and flanges are eliminated.

Exemplary embodiments enable tighter track density on the tape, and therefore higher storage capacity by reducing the disturbances to the edge of the tape from the tape guide flanges. Manufacturing precision required for the guides and guide flanges are also reduced since an increase in the tape path length compensates for misalignment between the tape pack and rollers. Furthermore, exemplary embodiments reduce the precision required for the tape reel flanges. Tape life can also be extended since the contact forces between the tape edges and guide flanges are minimized.

FIG. 1 illustrates a tape drive system 11 that includes one or more tape drives 2 (shown as tape drive A to tape drive N) with removable tape cartridges 4 networked to one or more computers 6 (shown as computer A to computer N) through wired and/or wireless links or networks 8.

Figure 2:
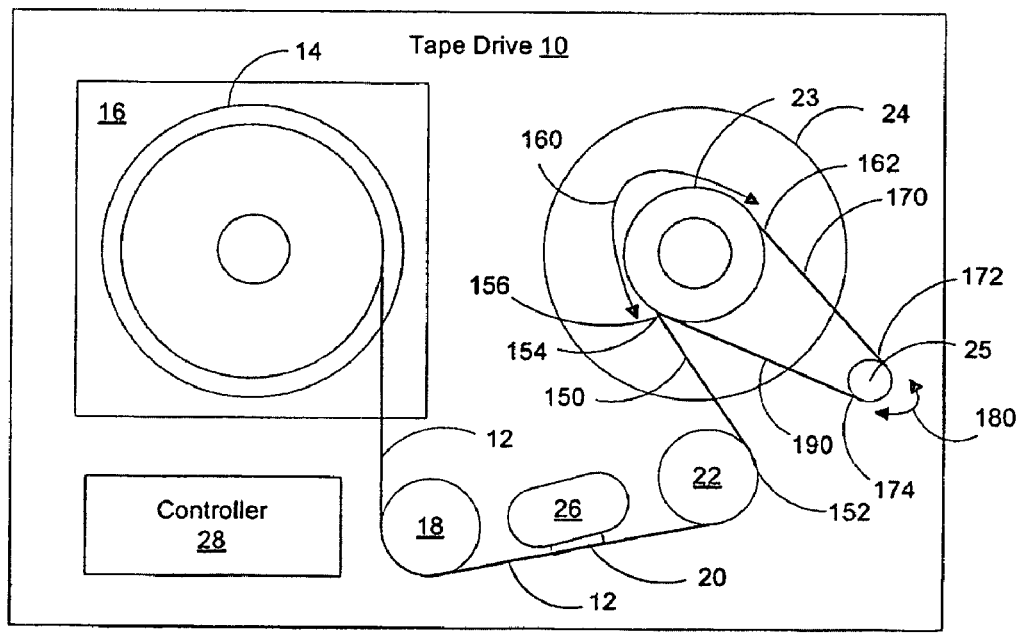
FIG. 2 is a tape drive in accordance with an exemplary embodiment of the present invention.

FIG. 2 illustrates a tape drive 10 such as might be used in the tape drive system of FIG. 1. In tape drive 10 in FIG. 2, magnetic tape 12 is wound on a cartridge reel or supply reel 14 inside removable cartridge 16. When cartridge 16 is inserted into drive 10, tape 12 passes around a first roller or guide 18, over head 20, around a second roller or guide 22, and winds onto a tape pack 23 of a drive or take-up reel 24. The tape passes partially around the circumference of the tape pack 23 and then exits the drive reel 24 to a third roller or guide (guide element) 25. After passes at least partially around this third guide 25, the tape is directed back to the drive reel 24 for winding on the tape pack 23.

The head 20 includes an array of elements that read and record information on tape 12. Generally, the head converts an electrical signal to a form required to record the signal to a medium (a write element), or reads a signal from a medium and converts it to an electrical signal (a read element), or both. Tape drives typically use magnetic head elements, where an electrical signal drives a time-varying magnetic field that magnetizes spots, or domains, on the surface of the magnetic tape.

Head 20 is mounted to an actuator 26 that moves head 20 across the width of tape 12. An electronic controller 28 receives read and write instructions and data from a computer 6 (FIG. 1) or other host device. Controller 28, which may include more than one controller unit, includes the programming, processor(s) and associated memory and electronic circuitry necessary to control actuator 26, head 20 and the other operative components of tape drive 10. As actuator 26 carries head assembly 20 back and forth across the width of tape 12, controller 28 selectively activates the head elements to read or record data on tape 12 according to instructions received from the host device.

Figure 3A:
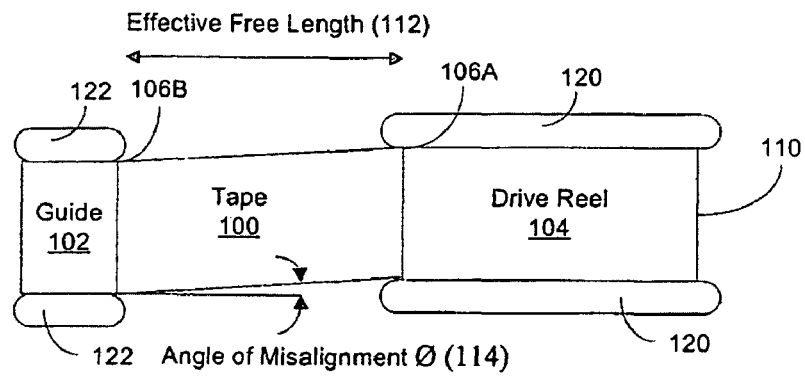
FIG. 3A is diagram showing a shortened tape path length extending between a tape guide and drive reel in a tape drive in accordance with an exemplary embodiment of the present invention.
Figure 3B:
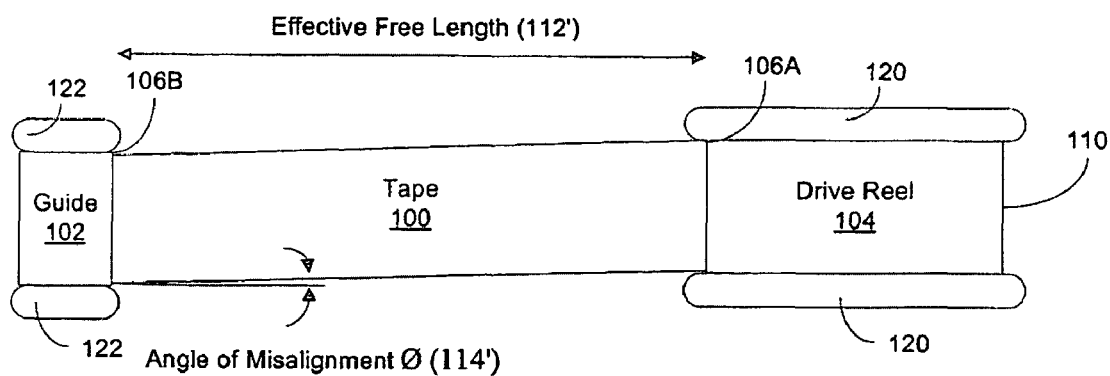
FIG. 3B is diagram showing a lengthened tape path length extending between a tape guide and drive reel in a tape drive in accordance with an exemplary embodiment of the present invention.

FIGS. 3A and 3B illustrate lengthening of the tape path in accordance with exemplary embodiments. Magnetic tape 100 extends between a tape roller or guide 102 and a take-up reel or drive reel 104. The nip point 106A for the drive reel 104 is the tangential location where the magnetic tape 100 exits the tape pack 110 on the drive reel. The nip point represents a tangential-location at a circle and is located at the outer diameter of the tape pack or location where the tape enters or exits the tape pack. The guide 102 also has a nip point 106B where the tape enters the guide.

An effective free length of tape 112 extends between the nip point 106A of the drive reel 110 and the nip point 106B of the guide 102. When the magnetic tape 100 is not centered between the flanges 120 of the drive reel 104, the magnetic tape 100 becomes misaligned with the guide 102. The angle of misalignment (Ø) 114 causes the tape to improperly align with the guide 102. Specifically, if the free length of tape contacts the reel flanges 120, the impact will cause the tape 100 to abruptly move laterally and disrupt registration between the read/write head 20 (see FIG. 2) and the data track location. Because of the clearance needed to avoid contact with the reel flanges while winding onto the reel, the tape pack ends up being misaligned in height from the tape guide 102. As the tape is then pulled from the drive reel 104, the misalignment of the tape pack 110 with the guide 102 creates excessive stress on the edges or sides of the tape 100. This misalignment also creates disturbances from the guide flanges 122 to the tape 100 and causes track misregistration.

As shown in FIG. 3B, the angle of misalignment (Ø) 114' is significantly reduced since the effective free length 112' of tape 100 is increased. In other words, by extending or lengthening the tape path in the tape drive, misalignment between the tape pack 110 of the drive reel 104 and the guide 102 is reduced. This reduction in misalignment reduces stress on the edges or sides of the tape 100 and decreases disturbances induced from contact of the tape with the guide flanges 122.

As shown in FIG. 2, exemplary embodiments utilize an additional roller or guide 25 to increase a length of the tape path or effective free length of the tape 12. This increase is equal to a partial or almost full circumference around the tape pack 23 plus distance from the tape pack 23 to roller 25, plus the distance from the roller 25 back to the tape pack.

The tape path length from the guide 22 to the drive reel 24 is traditionally equal to a distance 150 that the tape extends from a nip point 152 at the roller 22 to a nip point 154 at the tape pack 23. Exemplary embodiments, however, significantly increase this tape path length. This increase is equal to the following: a distance 160 that the tape extends from the nip point 154 around the tape pack 23 to a second nip point 162 of the tape pack, plus another distance 170 that the tape extends from the nip point 162 to a first nip point 172 of the guide 25, plus a distance 180 that the tape extends from the nip point 172 around the guide 25 to a second nip point 174, plus a distance 190 that the tape extends from the nip point 174 to the nip point 156 (which is located very close to the nip point 154).

Typically, the physical size of the tape drive is a predefined form factor having a relatively small space. Exemplary embodiments provide methods and apparatus for increasing the length of the tape path inside the tape drive as the tape passes from the cartridge reel to and from the drive reel. Tape is pulled off the drive reel, wrapped around a guide, and then back onto the tape pack of the drive reel to increase the length of the tape path.

Figure 4A:
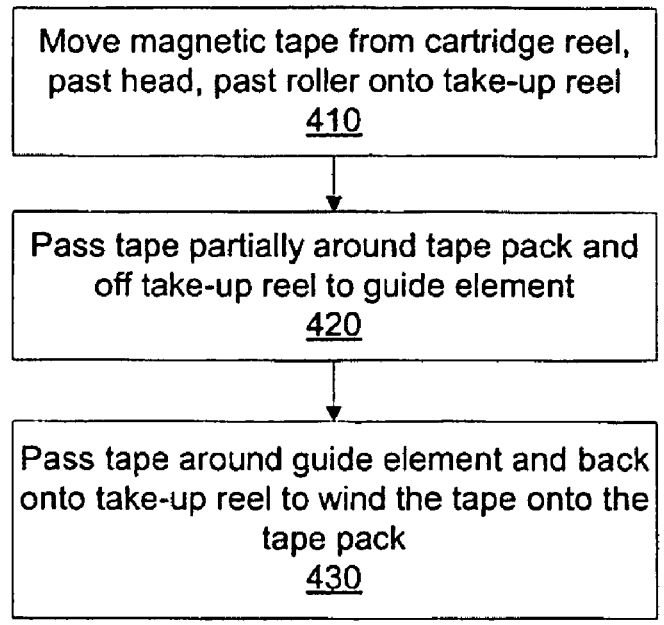
FIG. 4A is a flow diagram for winding tape onto a drive reel in accordance with an exemplary embodiment of the present invention.

FIG. 4A is a flow diagram for winding tape onto a drive feel in accordance with an exemplary embodiment of the present invention.

According to block 410, the magnetic tape is moved from the supply reel or cartridge reel, past a first roller, past the head, past a second roller, and onto the take-up reel or drive reel.

According to block 420, the tape then partially wraps around an outer circumference of the tape pack on the drive reel. The tape then exits the tape pack of the drive reel to a guide element (such as a guide or roller) that is located in the tape drive adjacent the drive reel.

According to block 430, the tape passes around the guide element and back onto the tape pack of the drive reel. Here, the tape is wound around the tape pack of the drive reel.

Figure 4B:
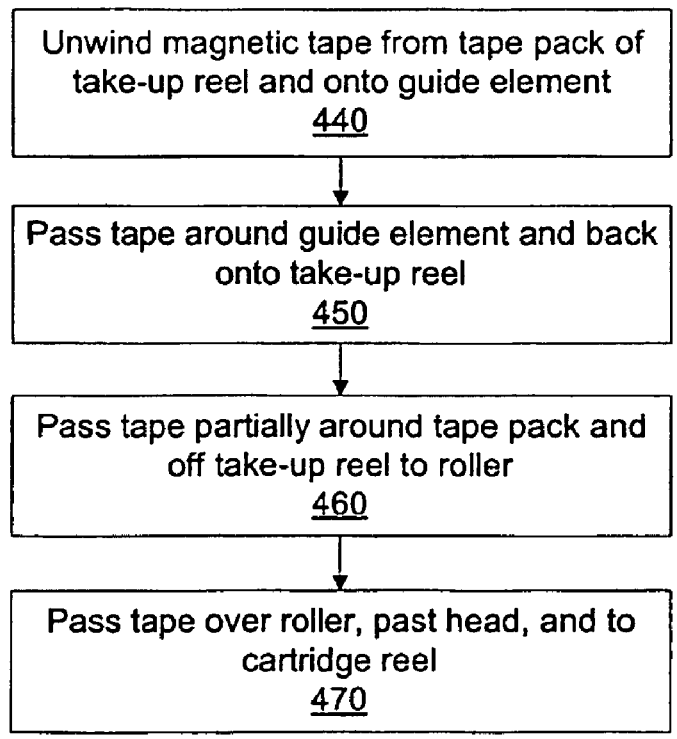
FIG. 4B is a flow diagram for unwinding tape from a drive reel in accordance with an exemplary embodiment of the present invention.

FIG. 4B is a flow diagram for unwinding tape from a drive reel in accordance with an exemplary embodiment of the present invention.

According to block 440, as the tape begins to unwind from the tape pack of the drive reel, the tape exits the tape pack to the guide element.

According to block 450, the tape passes around the guide element and back to the tape pack of the drive reel.

According to block 460, the tape passes partially around the outer circumference of the tape pack of the drive reel. The tape then exits the tape pack to a first guide or roller.

According to block 470, the tape passes past the first guide or roller, past the head, past a second guide or roller and to the supply reel or cartridge reel where the tape is wound.

Figure 5:
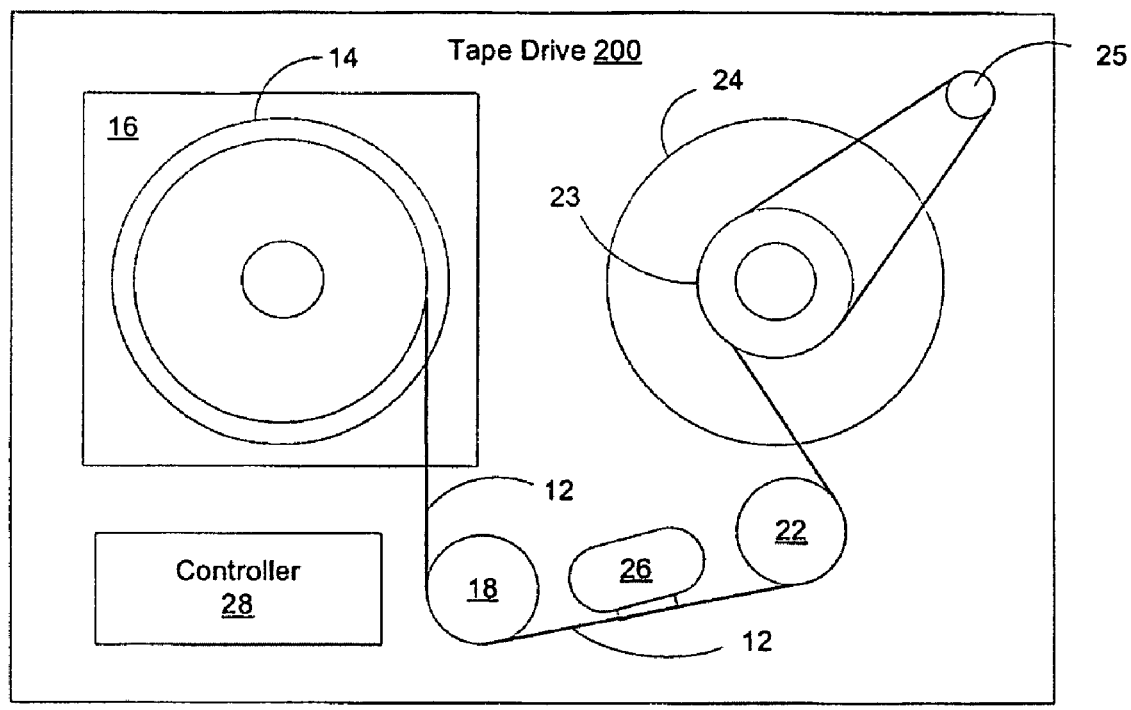
FIG. 5 is an alternate embodiment of a tape drive in accordance with an exemplary embodiment of the present invention.

Exemplar embodiments are not limited to any particular location of the guide element 25. By way of example, FIG. 5 shows an alternate embodiment of a tape drive 200 wherein like numerals refer to like elements with respect to FIG. 2. As shown in FIG. 5, the guide element 25 is moved to a corner of the tape drive 200.

Exemplary embodiments are not limited to any particular type, style, shape, quantity, etc. of rollers and guides. By way of example, such rollers and guides in the tape drive include both static guides (i.e., fixed or stationary guides that do riot rotate as tape passes around) rollers (i.e., fixed or stationary guides that rotate as tape passes around), and may include one or more guides between the head and either reel.

Exemplary embodiments of the invention are not limited to any particular type of tape drive or magnetic tape. Further, although embodiments are discussed with respect to the take-up or drive reel, exemplary embodiments can also be utilized with a source or cartridge reel. Also, other forms of tape are applicable, such as optical tape.

DEFINITIONS

As used herein and in the claims, the following words have the following definitions:

The term "effective length of tape" means length of tape path that extends from a take-up or drive feel in a tape drive to a guide or roller before the head.

A "head element" or "head" means a transducer that converts an electrical signal to a form required to record the signal to a medium (a write element), or reads a signal from a medium and converts it to an electrical signal (a read element), or both.

The term "nip point" means a location or point where a free length of tape is tangent to an outer diameter of a tape pack of a tape reel.

The term "tape drive" means a data storage device that reads and/or writes data stored on a magnetic tape.

In one exemplary embodiment, one or more blocks in the flow diagrams are automated. In other words, apparatus systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The flow diagrams in accordance with exemplary embodiments of the present invention are provided as examples and should not be construed to limit other embodiments within the scope of the invention. For instance, the blocks should not be construed as steps that must proceed in a particular order. Additional blocks/steps may be added, some blocks/steps removed, or the order of the blocks/steps altered and still be within the scope of the invention. Further, blocks within different figures can be added to or exchanged with other blocks in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive, flash memory, or hard drive. The software programming code is embodied or stored on any of a variety of known media for use with a data processing system or in any memory device such as semiconductor, magnetic and optical devices, including a disk, hard drive, CD-ROM, ROM, flash memory, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A tape drive, comprising:
   a head to read or write data to tape for recording data; and
   a drive reel onto which the tape is wound, the tape having plural nip points at which the tape exits or enters a tape pack on the drive reel, wherein the tape exits the tape pack at a first nip point, extends from the first nip point to a guide element, passes around the guide element, extends from the guide element to re-enter the tape pack at a second nip point, and extends from the second nip point to pass partially around the tape pack before exiting the tape pack at a third nip point for the head, and wherein a first distance between the first nip point and the third nip point is less than a second distance between the second nip point and the third nip point.

2. The tape drive of claim 1, wherein the tape path is extended to compensate for the tape pack being off-center between two flanges of the drive reel.

3. The tape drive of claim 1, wherein the tape path is extended to decrease an angle of misalignment of the tape extending between the drive reel and the head.

4. The tape drive of claim 1 further comprising, two guides positioned on opposite sides of the head, and the tape path extends from the tape pack, to the guide element, back to the tape pack, and then to one of the two guides before passing across the head.

5. The tape drive of claim 1, wherein the guide element is flangeless.

6. The tape drive of claim 1, wherein the tape is extended to increase the tape path between the head and the drive reel.

7. The tape drive of claim 1, wherein at a particular one of the nip points, a particular portion of the tape is tangent to an outer diameter of the tape pack.

8. The tape drive of claim 1, wherein the first distance is less than a third distance between the first nip point and the second nip point.

9. A method, comprising:
   extending a tape path to compensate for misalignment between tape on a reel and a head, the tape having plural nip points at which the tape exits or enters a tape pack on the reel, and wherein extending the tape path comprises:
   exiting the tape pack at a first nip point, extending the tape from the first nip point to pass around a guide element, extending from the guide element to a second nip point, entering the tape pack at the second nip point, and extending the tape from the second nip point to pass partially around the tape pack before exiting the tape pack at a third nip point, wherein a first distance between the first nip point and the third nip point is less than a second distance between the second nip point and the third nip point.

10. The method of claim 9, wherein the tape is increased by a distance equal to at least a first distance from the tape pack to a guide element plus a second distance from the guide element to the tape pack plus a circumferential distance partially around the tape pack.

11. The method of claim 9 further comprising, reducing disturbances to an edge of the tape from flanges on a guide by increasing a length of the tape path.

12. A tape drive system, comprising:
a computer;
a tape cartridge including tape for recording data; and
a tape drive to receive the tape cartridge, wherein the tape drive is in communication with the computer and includes a head and a drive reel, the tape having plural nip points at which the tape exits or enters a tape pack on the drive reel, wherein the tape exits the tape pack at a first nip point, extends from the first nip point to a guide element, passes around the guide element, extends from the guide element to re-enter the tape pack at a second nip point, and extends from the second nip point to pass partially around the tape pack before exiting the tape pack at a third nip point for the head, and wherein a first distance between the first nip point and the third nip point is less than a second distance between the second nip point and the third nip point.

13. The tape drive system of claim 12 further comprising, a guide element that receives the tape from the tape pack and positions the tape back onto the tape pack before the tape unwinds to the head.

14. The tape drive system of 12, wherein the tape path is lengthened in the tape drive to align the tape with respect to the head.

15. The tape drive system of claim 12, wherein the head is positioned between two guides and the tape exits the tape pack, wraps partially around a third guide, re-enters the tape pack, travels around the tape pack, and exits the tape pack a second time toward one of the two guides.

* * * * *